W. M. UPDEGRAVE.
EYE TESTING CHART.
APPLICATION FILED MAY 23, 1918.
1,391,084. Patented Sept. 20, 1921.
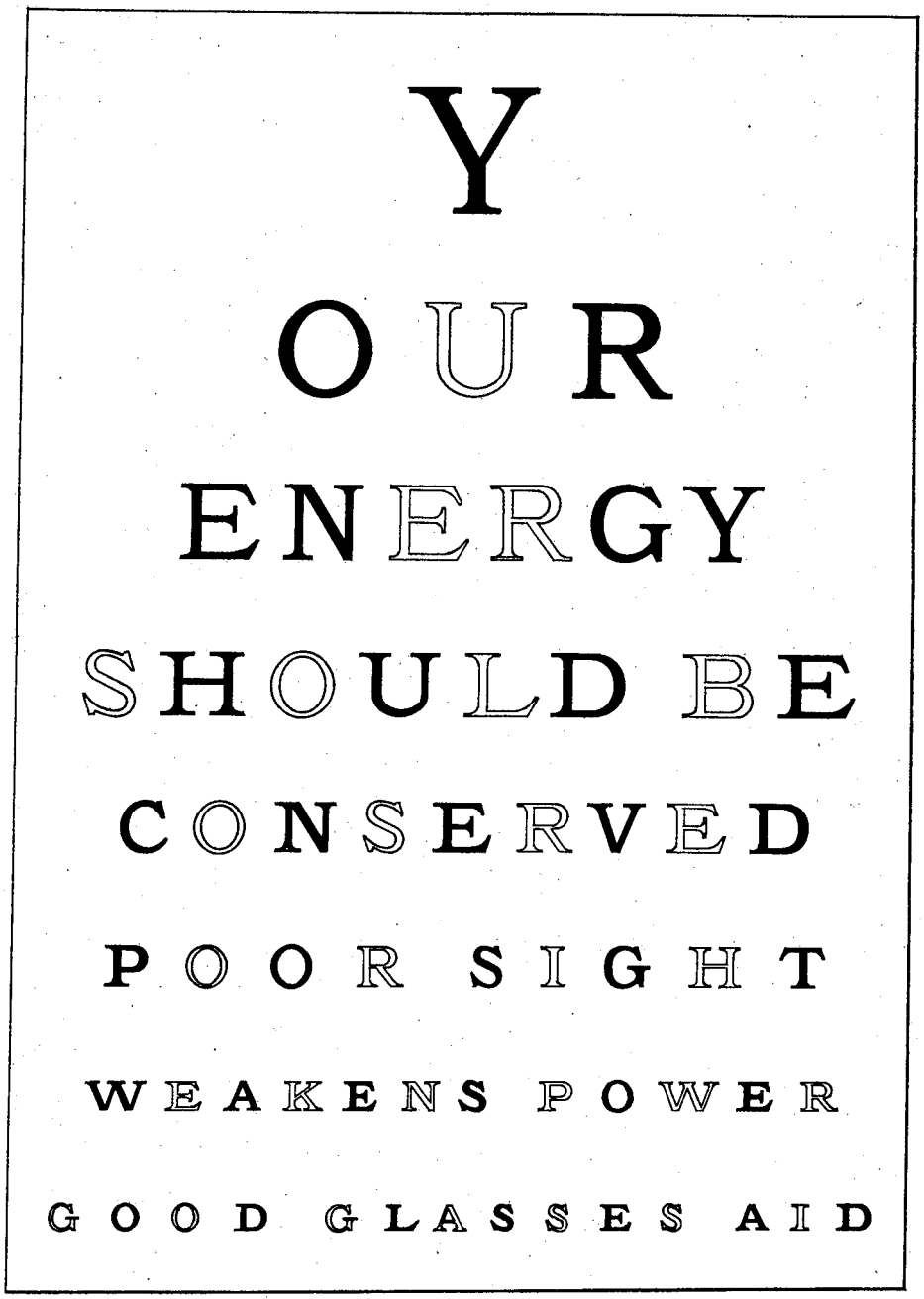

UNITED STATES PATENT OFFICE.

WILLIAM MARSH UPDEGRAVE, OF JOHNSTOWN, PENNSYLVANIA.

EYE-TESTING CHART.

1,391,084.  Specification of Letters Patent.  Patented Sept. 20, 1921.

Application filed May 23, 1918. Serial No. 236,123.

*To all whom it may concern:*

Be it known that I, WILLIAM M. UPDEGRAVE, a citizen of the United States, resident of Johnstown, in the county of Cambria and State of Pennsylvania have made a certain new and useful Invention in Eye-Testing Charts; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The figure is a face view of the invention.

The invention has relation to eye testing charts, having for its object to detect color blindness, as well as to give the usual tests for size of type as related to an observer or patient at a regulated or prescribed distance. Another object is to avoid having the patient carry in his mind the context in testing first one eye and then the other.

The invention consists in the novel construction and combinations of parts, as hereinafter set forth.

In the accompanying drawings, illustrating the invention, a chart is shown having letters graduated in size as usual, from large type gradually to smaller type, made up preferably into a complete sentence.

In each line of the chart, except the top letter, the word or words have some of the letters thereof printed black, and the balance of the letters thereof printed in red, and in testing, the patient is asked to first close one eye and pick out the letters of the chart of one color, and to then close the other eye and pick out the letters of the chart of another color.

In this way, the patient cannot readily carry over or remember the letters or words picked out by one eye, when the test is made for the other eye. Furthermore, if the patient is color blind all of the letters will appear black, color blindness being detected at once.

The chart is preferably arranged to include a complete sentence or sentences, to be read when the examination is completed.

If desired, the letters of the chart may be printed in more than two colors.

I claim:

An eye testing chart, composed of lines of letters, the letters arranged in words and the words arranged to express a thought, the letters of each line being of the same size and differing in size from the letters of the other lines, and certain of the letters of the lines being black and the other letters of such color as will appear black to a color blind person, whereby in testing each eye, one eye reading the black letters and the other eye the colored letters, neither eye will read a sequence that can be readily carried in mind, when the chart is read by a non-color blind person.

In testimony whereof I affix my signature in presence of two witnesses.

WILLIAM MARSH UPDEGRAVE.

Witnesses:
RUSSELL PROVOST,
JAMES A. GRAHAM.